United States Patent
Jiang et al.

(10) Patent No.: US 11,337,244 B2
(45) Date of Patent: May 17, 2022

(54) SCHEDULING SUBBAND ALLOCATION METHOD AND APPARATUS, AND DEVICE AND READABLE STORAGE MEDIUM

(71) Applicant: XI'AN ZHONGXING NEW SOFTWARE CO., LTD., Shaanxi (CN)

(72) Inventors: Chuangxin Jiang, Guangdong (CN); Zhaohua Lu, Guangdong (CN); Nan Zhang, Guangdong (CN); Shujuan Zhang, Guangdong (CN); Yu Ngok Li, Guangdong (CN); Meng Mei, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/046,846

(22) PCT Filed: Mar. 21, 2019

(86) PCT No.: PCT/CN2019/079071
§ 371 (c)(1),
(2) Date: Oct. 12, 2020

(87) PCT Pub. No.: WO2019/196623
PCT Pub. Date: Oct. 17, 2019

(65) Prior Publication Data
US 2021/0160913 A1    May 27, 2021

(30) Foreign Application Priority Data
Apr. 12, 2018 (CN) .......................... 201810327045.8

(51) Int. Cl.
*H04W 72/12* (2009.01)
*H04W 76/10* (2018.01)
(Continued)

(52) U.S. Cl.
CPC ....... *H04W 72/1289* (2013.01); *H04L 5/0053* (2013.01); *H04W 72/0453* (2013.01); *H04W 76/10* (2018.02)

(58) Field of Classification Search
CPC ............. H04W 72/1289; H04W 76/10; H04W 72/0453; H04W 72/042; H04L 5/0053;
(Continued)

(56) References Cited

U.S. PATENT DOCUMENTS 10,367,613 B2 * 7/2019 Zhou ..................... H04L 5/0007
2013/0294393 A1   11/2013 Park et al.
(Continued)

FOREIGN PATENT DOCUMENTS

CN    101272364 A    9/2008
CN    102083223 A    6/2011
(Continued)

OTHER PUBLICATIONS

International Search Report for Application No. PCT/CN2019/079071, dated Jun. 6, 2019, 2 pages.
(Continued)

*Primary Examiner* — Hirdepal Singh
(74) *Attorney, Agent, or Firm* — KDB Firm PLLC

(57) ABSTRACT

Provided are a scheduling subband allocation method and apparatus, and a device and a readable storage medium. The method includes: receiving downlink control information (DCI) sent by a base station, and determining scheduling subbands in a physical uplink shared channel (PUSCH); and establishing a correspondence between precoding indications in the DCI and the scheduling subbands in the PUSCH according to at least one parameter of the total number of the scheduling subbands in the PUSCH or the total frequency
(Continued)

| UE0 | | UE1 | |
|---|---|---|---|
| 0 | | 0 | |
| 1 | | 1 | |
| 2 | | 2 | |
| 3 | | 3 | |
| 4 | | 4 | |
| 5 | | 5 | |
| 6 | | 6 | |
| 7 | | 7 | |
| 8 | | 8 | |
| 9 | | 9 | |
| 10 | | 10 | |
| 11 | | 11 | |
| 12 | | 12 | |
| 13 | | 13 | |
| 14 | | 14 | |
| 15 | | 15 | | domain distance of the scheduling subbands in the PUSCH and according to the total number of the precoding indications in the DCI.

20 Claims, 8 Drawing Sheets

(51) Int. Cl.
  *H04L 5/00* (2006.01)
  *H04W 72/04* (2009.01)
(58) Field of Classification Search
  CPC ..... H04L 5/0051; H04L 5/001; H04L 5/0044; H04L 5/0094; H04B 7/0417
  USPC ......................................................... 455/450
  See application file for complete search history.

(56) References Cited

U.S. PATENT DOCUMENTS

| | | | |
|---|---|---|---|
| 2015/0131546 A1 | 5/2015 | Seo et al. | |
| 2017/0338911 A1* | 11/2017 | You | H04L 1/1861 |
| 2019/0229785 A1* | 7/2019 | Wang | H04B 7/0478 |
| 2020/0119783 A1* | 4/2020 | Liu | H04B 7/0456 |
| 2020/0162133 A1* | 5/2020 | Harrison | H04B 7/0486 |

FOREIGN PATENT DOCUMENTS

| | | |
|---|---|---|
| CN | 107612599 A | 1/2018 |
| CN | 108668368 A | 10/2018 |

OTHER PUBLICATIONS

Supplementary European Search Report for the European Application No. 19785269, dated Dec. 10, 2021, 9 pages.
First Office Action for the Indian Application No. 202027049488, dated Dec. 17, 2021, 5 pages.
First Office Action for the Chinese Application No. 2018103270458, dated Jan. 4, 2022, 8 pages.
First Search Report for the Chinese Application No. 2018103270458, dated Jan. 4, 2022, 3 pages.
InterDigital Inc. "On TRI and TPMI indication for CB-based UL transmission" Vancouver, Canada, Jan. 22-26, 2018, R1-1800626, 4 pages.
Huawei, HiSilicon, "Codebook based transmission for UL Mimo" 3GPP TSG RAN WG1 NR Ad Hoc Meeting—Qingdao, China, Jun. 27-30, 2017, R1-1710447, 9 pages.

* cited by examiner

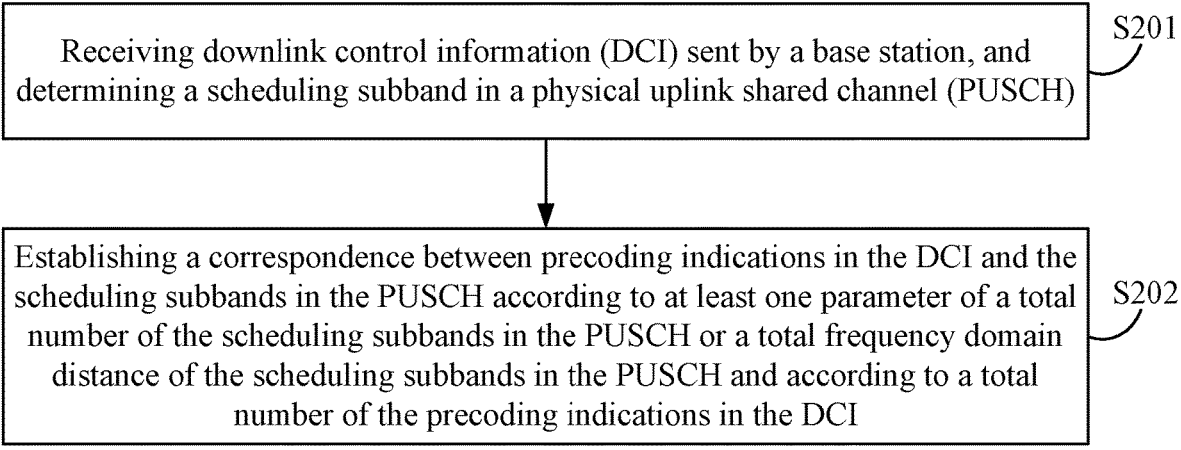

FIG. 1

| Receiving downlink control information (DCI) sent by a base station, and determining a scheduling subband in a physical uplink shared channel (PUSCH) | S201 |

| Establishing a correspondence between precoding indications in the DCI and the scheduling subbands in the PUSCH according to at least one parameter of a total number of the scheduling subbands in the PUSCH or a total frequency domain distance of the scheduling subbands in the PUSCH and according to a total number of the precoding indications in the DCI | S202 |

FIG. 2

| Subband index | PUSCH scheduling subband |
|---|---|
| 6 | ☐ |
| 7 | |
| 8 | |
| 9 | |
| 10 | ☐ |
| 11 | |
| 12 | |
| 13 | |
| 14 | ☐ |
| 15 | |
| 16 | |
| 17 | |
| 18 | ☐ |
| 19 | |
| 20 | |
| 21 | ☐ |

FIG. 8

| Subband index | | | | | | |
|---|---|---|---|---|---|---|
| 0 | $I_0$ | | | | | |
| 1 | | | | | | |
| 2 | | | | | | |
| 3 | | | | | | |
| 4 | | | ☐ | PUSCH scheduling subband | | |
| 5 | | | $I_j$ | Precoding information indication j | | |
| 6 | | | ☐ | Frequency domain subband group | | |
| 7 | | | | | | |
| 8 | | | | | | |
| 9 | | | | | | |
| 10 | | | | | | |
| 11 | | | | | | |
| 12 | $I_3$ | | | | | |
| 13 | $I_3$ | | | | | |
| 14 | $I_3$ | | | | | |
| 15 | $I_3$ | | | | | |

FIG. 9

| Subband index | |
|---|---|
| 0 | $I_0$ |
| 1 | |
| 2 | $I_0$ |
| 3 | |
| 4 | |
| 5 | $I_1$ |
| 6 | |
| 7 | |
| 8 | $I_1$ |
| 9 | |
| 10 | |
| 11 | |
| 12 | $I_2$ |
| 13 | $I_2$ |
| 14 | $I_3$ |
| 15 | $I_3$ |
| 16 | |
| 17 | $I_3$ |

FIG. 10

| Subband index | |
|---|---|
| 0 | $I_0$ |
| 1 | |
| 2 | $I_0$ |
| 3 | |
| 4 | |
| 5 | $I_1$ |
| 6 | |
| 7 | |
| 8 | $I_1$ |
| 9 | |
| 10 | |
| 11 | |
| 12 | $I_2$ |
| 13 | $I_2$ |
| 14 | $I_3$ |
| 15 | $I_3$ |
| 16 | |
| 17 | $I_3$ |

FIG. 11

| Subband index | |
|---|---|
| 0 | $I_0$ |
| 1 | $I_0$ |
| 2 | $I_0$ |
| 3 | $I_1$ |
| 4 | $I_1$ |
| 5 | $I_1$ |
| 6 | |
| 7 | |
| 8 | |
| 9 | |
| 10 | |
| 11 | |
| 12 | |
| 13 | |
| 14 | |
| 15 | $I_2$ |
| 16 | $I_2$ |
| 17 | $I_2$ |
FIG. 14
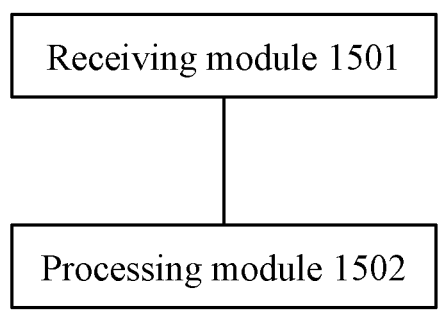
FIG. 15
FIG. 16

# SCHEDULING SUBBAND ALLOCATION METHOD AND APPARATUS, AND DEVICE AND READABLE STORAGE MEDIUM

CROSS-REFERENCE TO RELATED APPLICATIONS

This is a National Stage Application, filed under 35 U.S.C. 371, of International Patent Application No. PCT/CN2019/079071, filed on Mar. 21, 2019, which is based on and claims priority to Chinese patent application No. 201810327045.8 filed at the CNIPA on Apr. 12, 2018, disclosures of which are incorporated herein by reference in their entireties.

TECHNICAL FIELD

The present application relates to uplink transmission technologies and, for example, relates to a scheduling subband allocation method and apparatus, a device and a readable storage medium.

BACKGROUND

Currently, the uplink transmission includes codebook based transmission and non-codebook based transmission, the new radio technology (NR) only supports the notification of broadband precoding information by using a precoding indication in downlink control information (DCI). For users with strong channel frequency selectivity, the precoding indication will cause performance loss. However, no effective solution has been proposed to solve the problem of how to indicate the precoding information of the uplink scheduling subband.

SUMMARY

The present application provides a scheduling subband allocation method and apparatus, a device and a readable storage medium, overcoming the indication transmission defect of the precoding information of the uplink scheduling subband, and notifying the precoding information of the uplink scheduling subband whose quantity dynamically varies by using a fixed precoding indication in the DCI.

The present application provides a scheduling subband allocation method. The method includes steps described below.

DCI sent by a base station is received, and a scheduling subband in a physical uplink shared channel (PUSCH) is determined.

A correspondence between precoding indications in the DCI and the scheduling subbands in the PUSCH is established according to at least one parameter of the total number of the scheduling subbands in the PUSCH or a total frequency domain distance of the scheduling subbands in the PUSCH and according to the total number of the precoding indications in the DCI.

The present application further provides a scheduling subband allocation apparatus. The apparatus includes a receiving module and a processing module.

The receiving module is configured to receive DCI sent by a base station, and determine a scheduling subband in a PUSCH.

The processing module is configured to establish a correspondence between precoding indications in the DCI and the scheduling subbands in the PUSCH according to at least one parameter of the total number of the scheduling subbands in the PUSCH or a total frequency domain distance of the scheduling subbands in the PUSCH and according to the total number of the precoding indications in the DCI.

The present application further provides a scheduling subband allocation processing device. The device includes a processor, a memory and a communication bus.

The communication bus is configured to implement a connection communication between the processor and the memory.

The processor is configured to execute a scheduling subband allocation program stored in the memory to perform steps of the scheduling subband allocation method described above.

The present application further provides a computer-readable storage medium configured to store a scheduling subband allocation program.

When the scheduling subband allocation program is executed by at least one processor, the at least one processor performs steps of the scheduling subband allocation method described above.

BRIEF DESCRIPTION OF DRAWINGS

FIG. 1 is a schematic diagram showing frequency domain resources scheduled by multi-user in the related art;

FIG. 2 is a flowchart of a scheduling subband allocation method according to a first embodiment of the present application;

FIG. 8 is a schematic diagram showing a total frequency domain distance of scheduling subbands in a PUSCH according to the third embodiment of the present application;

FIG. 9 is a schematic diagram showing the division of frequency domain segments according to the third embodiment of the present application;

FIG. 10 is a schematic diagram showing a first division manner according to the third embodiment of the present application;

FIG. 11 is a schematic diagram showing a third division manner according to the third embodiment of the present application;

FIG. 14 is a schematic diagram showing a second division manner according to the fourth embodiment of the present application;

FIG. 15 is a structural diagram showing a scheduling subband allocation apparatus according to a fifth embodiment of the present application; and FIG. 16 is a structural diagram showing a scheduling subband allocation device according to a sixth embodiment of the present application.

DETAILED DESCRIPTION

Figure 3:
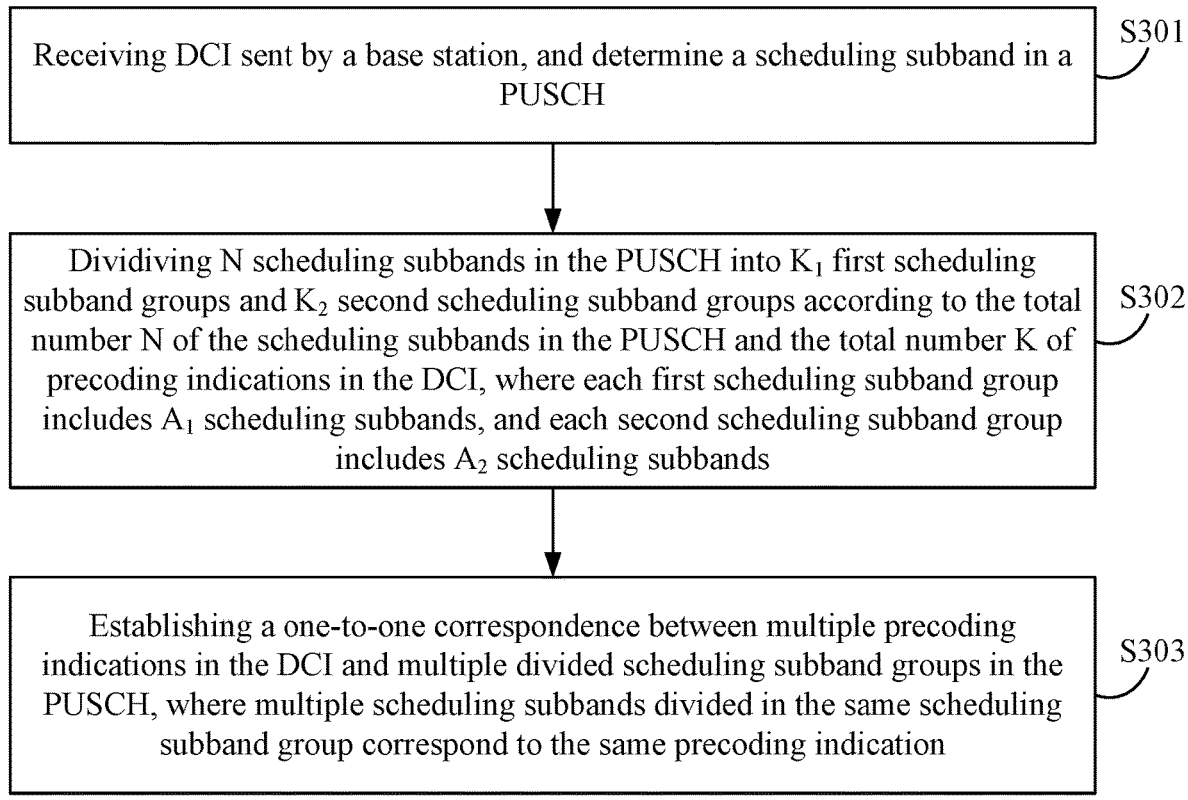
FIG. 3 is a flowchart of a scheduling subband allocation method in a second embodiment of the present application.

For uplink transmission, a base station uses DCI to notify some scheduling information to a user, such as allocation of frequency domain resources, indication of precoding information, etc. The allocation of frequency domain resources in the NR is classified into two modes, i.e., the resource allocation mode Type 0 and the resource allocation mode Type 1. In the resource allocation mode Type 0, the unit of resource scheduling is a resource block group (RBG). One RBG includes multiple physical resource blocks (PRBs). The multiple RBGs allocated by the base station to the user may be discontinuous. In the resource allocation mode Type 1, the unit of resource scheduling is the PRB. The multiple PRBs allocated by the base station to the user must be continuous. In addition, the number of RBGs or PRBs allocated by the base station to the user is dynamic. Currently, in the uplink transmission in the long term evolution (LTE) and the NR, the DCI further includes a precoding indication, and this precoding indication is used in all scheduled frequency domain PRBs of a Physical Uplink Shared Channel (PUSCH). If the channel multipath delay of the user is large, the channel frequency selectivity is strong, that is, the channel conditions in different frequency domain resources are greatly different, and thus the precoding indication of the broadband will cause the performance loss. In order to support the notification of different precoding indications on different frequency domain resources, the base station can notify different precoding information to different scheduling subbands.

One intuitive method is to divide resources scheduled by the PUSCH into several parts, each part is a scheduling subband, and each scheduling subband corresponds to a precoding indication. However, this method can cause problems in multi-user scheduling, especially when the frequency domain resources allocated by multiple users partially overlap. For example, as shown in FIG. 1, assuming that the number of scheduling subbands is 4, 8 PRBs allocated to the user UE0 are PRBs 4 to 11, and 8 PRBs allocated to the user UE1 are PRBs 3 to 10. For the UE0, PRB4 and PRB5 are one scheduling subband, and the precoding information of PRB4 is the same as the precoding information of PRB5. For the UE1, PRB3 and PRB4 are one scheduled subband, PRB5 and PRG6 are another scheduled subband, and the precoding information of PRB3 and PRB4 may be different from the precoding information of PRB5 and PRG6. Thus, the UE0 and the UE1 both scheduled on PRB4 and PRB5 are subjected to different interferences on PRB4 and PRB5 respectively, thereby causing great troubles to demodulation.

In order to solve the problem in multi-user scheduling, an entire component carrier (CC) or a bandwidth part (BWP) is divided into multiple frequency domain resource groups. Each frequency domain resource group is a frequency domain subband, and each frequency domain subband is the minimum unit of variation of precoding information, that is, the precoding information of all PRBs included in each frequency domain subband should be the same. For example, for the entire CC, every 2 continuous PRBs is one frequency domain subband; thus, for the UE0, four frequency domain subbands, i.e., PRB {4, 5}, PRB {6, 7}, PRB {8, 9}, and PRB {10, 11}, are scheduled; for the UE1, five frequency domain subbands, i.e., PRB {3}, PRB {4, 5}, PRB {6, 7}, PRB {8, 9} and PRB {10}, are scheduled. This method ensures that the division of the frequency domain subbands of different users is the same. The precoding information does not vary in the same frequency domain subband, so that the multi-user interference does not vary in the frequency domain subband either. The base station only needs to perform demodulation by taking the frequency domain subband as the minimum unit. The frequency domain subbands are divided according to a system bandwidth of the CC or the BWP, and have nothing to do with locations of scheduled frequency domain resources of the user. The size of the frequency domain subband may be a fixed value or notified through signaling such as high-layer signaling, or may be related to the number of PRBs scheduled by the PUSCH.

Intuitively, the base station can configure a precoding indication for each scheduling subband. For example, if the base station allocates four scheduling subbands to the user, then four transmit precoder indicators (TPMIs) are notified, and each TPMI corresponds to one scheduling subband. However, this solution can hardly be implemented because the number of PRBs allocate by the base station to the user varies dynamically, and thus the number of scheduling subbands may also vary dynamically. In order to ensure the low user complexity, a payload size of the DCI must be constant, or vary semi-statically, or the payload size of the DCI has few candidate values. Since the payload size of one DCI corresponds to a user equipment (UE) preforming a blind detection on the PDCCH, the number of precoding indications reserved in the DCI cannot vary dynamically as the number of PRBs or RBGs allocated to the PUSCH varies. Therefore, the number of precoding indications in the DCI must semi-statically varies or be fixed.

In order to solve the indication transmission problem of the precoding information of the uplink scheduling subband to notify the precoding information of the uplink scheduling subband whose quantity dynamically varies by using a fixed precoding indication in the DCI, a first embodiment of the present application provides a scheduling subband allocation method. As shown in FIG. 2, the method includes steps S201 and S202.

In step S201, DCI sent by a base station is received, and a scheduling subband in a PUSCH is determined.

In step S202, a correspondence between precoding indications in the DCI and the scheduling subbands in the PUSCH is established according to at least one parameter of the total number of the scheduling subbands in the PUSCH or a total frequency domain distance of the scheduling subbands in the PUSCH and according to the total number of the precoding indications in the DCI.

In one embodiment, the precoding indication includes one of: an indication of a TPMI or an indication of an SRI. The precoding indication may also include other subband information indications, such as an indication of a transmission rank indicator (TRI), an indication of a demodulation reference signal (DMRS) port, etc. The total number of precoding indications in the DCI is configured through high-layer signaling or is a default fixed value. In addition, the size of the scheduling subband in this embodiment is not necessarily equal to the RBG in the resource allocation mode Type 0, and may be composed of one or more RBGs. The size of the scheduling subband may be predefined as the RBG in the resource allocation mode Type 0, or may be notified through the high-layer signaling, or may be a candidate value selected by using DCI signaling from several candidate values configured by the high-layer signaling. Furthermore, the UE does not necessarily schedule all PRBs per subband, that is, only part of PRBs is actually scheduled on some scheduled subbands. The number of scheduling subbands specifically scheduled is determined by a frequency domain resource allocation indicating bit of the PUSCH in the DCI. The correspondence refers to at least one of the number of scheduling subbands and the scheduling subband sequence number in a PUSCH corresponding to each precoding indication in the DCI.

In one embodiment, the step S202 includes one of steps described below.

The correspondence between the precoding indications in the DCI and the scheduling subbands in the PUSCH is established according to the total number of the scheduling subbands in the PUSCH and the total number of the precoding indications in the DCI.

The correspondence between the precoding indications in the DCI and the scheduling subbands in the PUSCH is established according to the total frequency domain distance of the scheduling subbands in the PUSCH and the total number of the precoding indications in the DCI.

The correspondence between the precoding indications in the DCI and the scheduling subbands in the PUSCH is established according to the total number of the scheduling subbands in the PUSCH, the total frequency domain distance of the scheduling subbands in the PUSCH and the total number of the precoding indications in the DCI.

The above is applicable to the case where the number of precoding indications reserved in the DCI is less than the number of scheduling subbands included in the PUSCH, and in this case, some scheduling subbands should share the same precoding indication.

Furthermore, when the number of precoding indications reserved in the DCI is greater than the number of scheduling subbands included in the PUSCH, N precoding indications of K precoding indications are enough to notify N PUSCH scheduling subbands actually scheduled, and remaining (K−N) precoding indications are wasted. In order to enhance the robustness of DCI transmission, the value of the remaining (K−N) precoding indications is determined by one or more of N precoding indication values. For example, in the K precoding indications of the DCI, first N precoding indications correspond to the N PUSCH scheduling subbands respectively, and each value of the remaining (K−N) precoding indications is equal to the value of an N-th precoding indication. In one embodiment, the value of each of the remaining (K−N) precoding indications is equal to the value of a first precoding indication. This means repeated notifications, and the robustness is strong.

A second embodiment of the present application provides a scheduling subband allocation method. As shown in FIG. 3, the method includes steps S301, S302 and S303.

In step S301, DCI sent by a base station is received, and a scheduling subband in a PUSCH is determined.

In step S302, N scheduling subbands in the PUSCH are divided into $K_1$ first scheduling subband groups and $K_2$ second scheduling subband groups according to the total number N of the scheduling subbands in the PUSCH and the total number K of precoding indications in the DCI, where each first scheduling subband group includes $A_1$ scheduling subbands, and each second scheduling subband group includes $A_2$ scheduling subbands.

In one embodiment, $K_1$=mod(N, K), where mod( ) is a mathematical operation of taking the remainder;

$$K_2 = K - K_1;$$

$$A_1 = \left\lceil \frac{N}{K} \right\rceil,$$

where $\lceil \cdot \rceil$ is a mathematical operation of rounding up to an integer;

$$A_2 = \left\lfloor \frac{N}{K} \right\rfloor,$$

$\lfloor \cdot \rfloor$ is a mathematical operation of rounding down to an integer.

It can be seen that in this embodiment, the scheduling subbands in the PUSCH are divided into scheduling subband groups, the quantity of which is the same as the total number of precoding indications in the DCI, and each scheduling subband in the PUSCH cannot exist in multiple scheduling subband groups simultaneously. In addition, two types of scheduling subband groups are included in this embodiment: the first scheduling subband group includes $A_1$ scheduling subbands, and the second scheduling subband group includes $A_2$ scheduling subbands. When the value of N is an integer multiple of the value of K, the value of $A_1$ is equal to the value of $A_2$; when the value of N is not an integer multiple of the value of K, $A_1=A_2+1$.

In one embodiment, in order to make K precoding indications correspond to equally separated frequency domain scheduling resources as much as possible, N scheduling subbands in the PUSCH are divided into the $K_1$ first scheduling subband groups and the $K_2$ second scheduling subband groups specifically in one of four division manners described below.

The first division manner is to divide first ($K_1$*$A_1$) scheduling subbands in the PUSCH into the $K_1$ first scheduling subband groups, and divide last ($K_2$*$A_2$) scheduling subbands in the PUSCH into the $K_2$ second scheduling subband groups.

Figure 4:
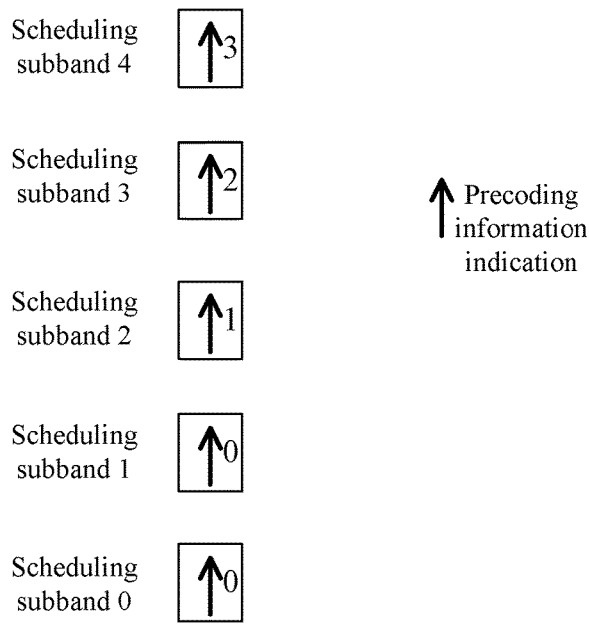
FIG. 4 is a schematic diagram showing a first division manner according to the second embodiment of the present application.

For example, as shown in FIG. 4, there are four precoding indications in the DCI, and the base station schedules five scheduling subbands to the UE, that is, N=5, and K=4, and thus $$A_1 = \left\lceil \frac{N}{K} \right\rceil = 2, A_2 = \left\lfloor \frac{N}{K} \right\rfloor = 1,$$

$K_1$=mod(N, K)=1, and $K_2$=K−$K_1$=3. According to the first division manner, the precoding information of the scheduling subband 0 and the scheduling subband 1 is notified by the precoding indication 0, and each of remaining scheduling subbands is notified by one separate precoding indication. Each precoding indication may require several bits.

The second division manner is to divide first ($K_2$*$A_2$) scheduling subbands in the PUSCH into the $K_2$ second scheduling subband groups, and divide last ($K_1$*$A_1$) scheduling subbands in the PUSCH into the $K_1$ first scheduling subband groups.

The third division manner is to alternately and sequentially divide N scheduling subbands in the PUSCH into a first scheduling subband group and a second scheduling subband group. That is, first $A_1$ continuous scheduling subbands in the PUSCH are divided into a first scheduling subband group, next $A_2$ continuous scheduling subbands are divided into a second scheduling subband group, then next $A_1$ continuous scheduling subbands are divided into a first scheduling subband group, and rest scheduling subbands are divided in the same way until $K_1$ or $K_1$ precoding indications are completely allocated. If $K_1$ is not equal to $K_2$, the last several indications are not alternated.

Figure 5:
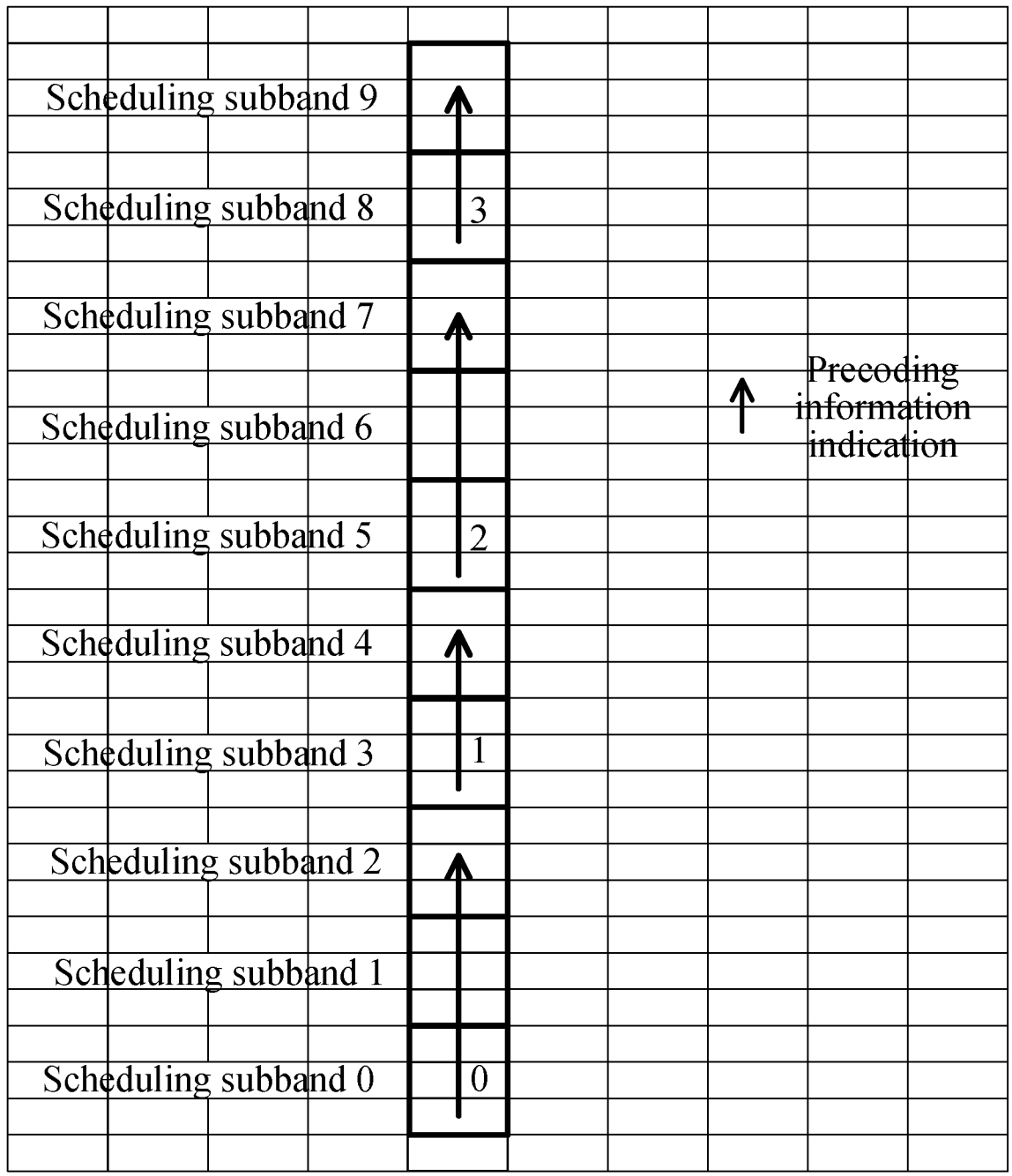
FIG. 5 is a schematic diagram showing a third division manner according to the second embodiment of the present application.

For example, as shown in FIG. 5, N=10, K=4, $A_1$=3, $A_2$=2, $K_1$=2, and $K_2$=2; the numbers of scheduling subbands corresponding to precoding indications 0, 1, 2 and 3 are 3, 2, 3 and 2 respectively. The advantage of the third division manner is that the scheduling subband corresponding to each precoding indication is more uniform.

The fourth division manner is to alternately divide N scheduling subbands in the PUSCH into a first scheduling subband group and a second scheduling subband group reversely. For example, first $A_1$ continuous scheduling subbands in the PUSCH are divided into a first scheduling subband group, next $A_2$ continuous scheduling subbands are divided into a second scheduling subband group, then next $A_2$ continuous scheduling subbands are divided into a second scheduling subband group, and then next $A_1$ continuous scheduling subbands are divided into a first scheduling subband group until $K_1$ or $K_2$ precoding indications are completely allocated. If $K_1$ is not equal to $K_2$, the last several scheduling subbands will not be alternated.

In step S303, a one-to-one correspondence between multiple precoding indications in the DCI and multiple divided scheduling subband groups in the PUSCH is established, where multiple scheduling subbands divided in the same scheduling subband group correspond to the same precoding indication.

In one embodiment, when the first division manner in the step S302 is adopted, a one-to-one correspondence between first $K_1$ precoding indications in the DCI and the $K_1$ first scheduling subband groups is established, and a one-to-one correspondence between last $K_2$ precoding indications in the DCI and the $K_2$ second scheduling subband groups is established.

First $K_1$ precoding indications in the K precoding indications correspond to first $(K_1*A_1)$ scheduling subbands in the PUSCH, where in the first $(K_1*A_1)$ scheduling subbands in the PUSCH, every $A_1$ continuous scheduling subbands corresponds to the same precoding indication. Last $K_2$ precoding indications in the K precoding indications correspond to last $(K_2*A_2)$ scheduling subbands in the PUSCH, where in the last $(K_2*A_2)$ scheduling subbands in the PUSCH, every $A_2$ continuous scheduling subbands corresponds to the same precoding indication.

When the second division manner in the step S302 is adopted, a one-to-one correspondence between first $K_2$ precoding indications in the DCI and the $K_2$ second scheduling subband groups is established, and a one-to-one correspondence between last $K_1$ precoding indications in the DCI and the $K_1$ first scheduling subband groups is established. In the first $(K_2*A_2)$ scheduling subbands in the PUSCH, every $A_2$ continuous scheduling subbands corresponds to the same precoding indication; while in the last $(K_1*A_1)$ scheduling subbands in the PUSCH, every $A_1$ continuous scheduling subbands corresponds to the same precoding indication.

When the third division manner in the step S302 is adopted, a first precoding indication corresponds to first $A_1$ continuous scheduling subbands in the PUSCH, a second precoding indication corresponds to next $A_2$ continuous scheduling subbands, a third precoding indication corresponds to next $A_1$ continuous scheduling subbands, and so forth.

When the fourth division manner in the step S302 is adopted, a first precoding indication corresponds to first $A_1$ continuous scheduling subbands in the PUSCH, a second precoding indication corresponds to next $A_2$ continuous scheduling subbands, a third precoding indication corresponds to next $A_2$ continuous scheduling subbands, and a fourth precoding indication corresponds to next $A_1$ continuous scheduling subbands.

It is to be noted that the continuous scheduling subbands in the PUSCH refer to that scheduling subbands allocated to the UE are continuous or adjacent, but are not defined as the absolute subband in the frequency domain. For example, when the scheduling subbands scheduled by the base station to the UE through the DCI are subbands #0 and #2, the scheduling subbands #0 and #2 are two continuous scheduling subbands of the PUSCH because the scheduling subband #1 is not allocated to the UE. In this embodiment, the K precoding indications can correspond to the approximate number of scheduling subbands as much as possible.

The method described in this embodiment is also applicable to a case of level 2 DCI, that is, K precoding indications are included in two DCIs.

Figure 6:
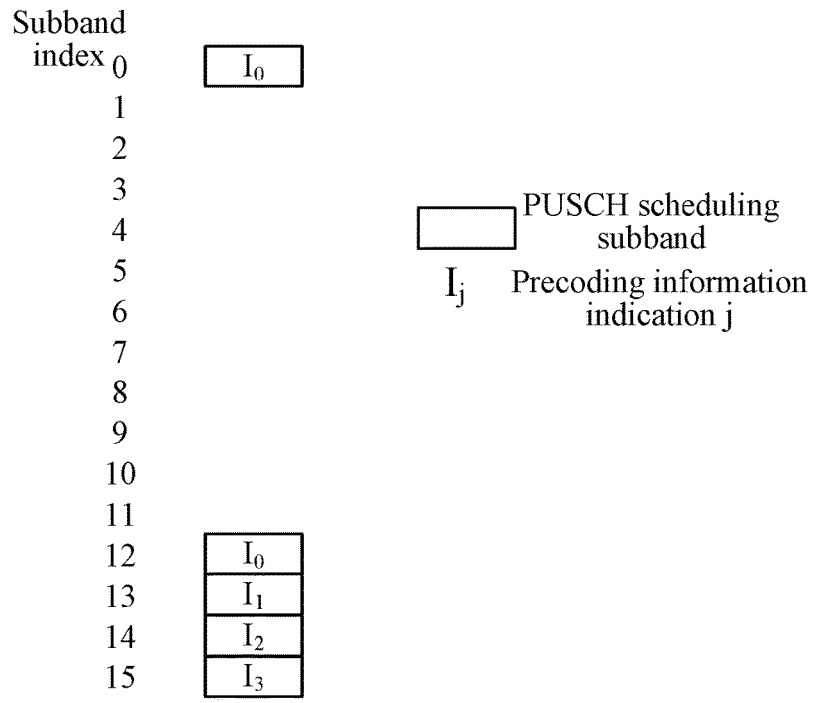
FIG. 6 is a schematic diagram showing the allocation of scheduling subbands for a precoding indication according to a third embodiment of the present application.
Figure 7:
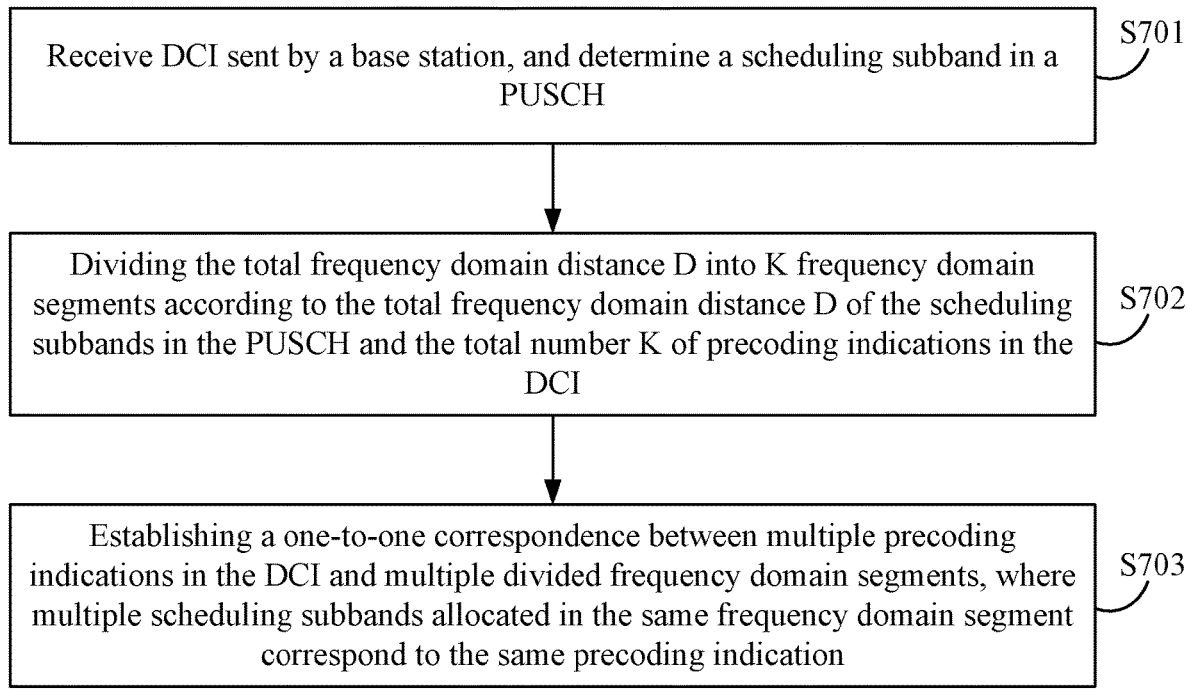
FIG. 7 is a flowchart of a scheduling subband allocation method according to the third embodiment of the present application.

The solution in the embodiment two is simple and easy to implement, but may also bring some problems. For example, in FIG. 6, for the PUSCH resource allocation mode Type 0, if scheduling subbands allocated by the PUSCH is discontinuous, according to the solution in the second embodiment, the scheduling subband 0 and the scheduling subband 12 correspond to the same precoding indication $I_0$. However, since a frequency domain distance between the scheduling subband 0 and the scheduling subband 12 is too far, the channel difference is too large, and using the same precoding indication may cause the performance loss. A third embodiment of the present application provides a scheduling subband allocation method. As shown in FIG. 7, the method includes steps S701, S702 and S703.

In step S701, DCI sent by a base station is received, and a scheduling subband in a PUSCH is determined.

In step S702, the total frequency domain distance D is divided into K frequency domain segments according to the total frequency domain distance D of the scheduling subbands in the PUSCH and the total number K of precoding indications in the DCI.

In this embodiment, the total frequency domain distance of the scheduling subbands in the PUSCH refers to a frequency domain distance from a first scheduling subband to a last scheduling subband in the PUSCH, or a frequency domain distance from the first scheduling subband to the last scheduling subband in the PUSCH plus 1. For example, as shown in FIG. 6, since the first scheduling subband in the PUSCH is the frequency domain subband 0, and the last scheduling subband is the frequency domain subband 15, then the total frequency domain distance D of the scheduling subbands in the PUSCH is D=15−0=15, or D=15−0+1=16. As also shown in FIG. 8, since the first scheduling subband in the PUSCH is the frequency domain subband 6 and the last scheduling subband is the frequency domain subband 21, then the total frequency domain distance D of the scheduling subbands in the PUSCH is D=21−6+1=16, or D=21−6=15. In other words, the correspondence of the precoding indications and the PUSCH scheduling frequency domain resources (PRBs or subbands) is at least related to the frequency domain distance of the PUSCH scheduling resources. The unit of the frequency domain distance may be one or more of the number of PRBs, the number of subbands, or the number of subcarriers in the frequency domain. In this embodiment, the frequency domain subbands refer to some frequency domain resources in the frequency domain, and the frequency domain subbands are composed of several PRBs or RBGs. The index of each frequency domain subband has a relation with the frequency domain resource and has nothing to do with whether the frequency domain subband is scheduled by the UE. Generally, if there is no PUSCH scheduling subband allocated on a certain frequency domain subband or some frequency domain subbands, the precoding indication corresponding to the frequency domain subband is not useful.

For example, as shown in FIG. 9, the total frequency domain distance of the scheduling subbands in the PUSCH is 16 frequency domain subbands, which are divided into K frequency domain segments in total, and each frequency domain segment includes D/K=16/4=4 frequency domain subbands. That is, frequency domain subbands 0 to 3 constitute the frequency domain segment 0, frequency domain subbands 4 to 7 constitute the frequency domain segment 1, frequency domain subbands 8 to 11 constitute the frequency domain segment 2, and frequency domain subbands 12 to 15 constitute the frequency domain segment 3. The 4 frequency domain segments and the 4 precoding indications are in a one-to-one correspondence. Since the scheduling subbands in the PUSCH actually only have frequency domain subbands 0, 12, 13, 14 and 15, that is, the scheduled PUSCH scheduling subbands are allocated only in frequency domain segments 1 and 3, the precoding information of the frequency domain subband 0 in the allocated scheduling subbands in the PUSCH is notified by the first precoding indication $I_0$, the precoding information of allocated scheduling subbands 12 to 15 in the PUSCH is notified by the fourth precoding indication $I_3$, and the remaining second and third precoding indications are not used. In one embodiment, the second and third precoding indications which are not used are determined by the first or fourth precoding indication, such as the second and third precoding indications are the same as the first or fourth precoding indication, so as to enhance the robustness of the indication. In one embodiment, since D is not necessarily an integer multiple of K, the number of frequency domain subbands included in each frequency domain segment may be different, and the step S702 includes the step described below.

The total frequency domain distance D is divided into $K_1$ first frequency domain segments and $K_2$ second frequency domain segments, where each first frequency domain segment includes $G_1$ continuous frequency domain subbands, and each second frequency domain segment includes $G_2$ continuous frequency domain subbands.

In the above step, $$K_1 = \mathrm{mod}(D, K), K_2 = K - K_1, G_1 = \left\lceil \frac{D}{K} \right\rceil, \text{ and } G_2 = \left\lfloor \frac{D}{K} \right\rfloor.$$

That is, in K frequency domain segments, there are $K_1$ first frequency domain segments, and each first frequency domain segment includes $G_1$ frequency domain subbands that are continuous in the frequency domain; and there are $K_2$ second frequency domain segments and each second frequency domain segment includes $G_2$ frequency domain subbands that are continuous in the frequency domain.

In one embodiment, the total frequency domain distance D may be divided into the $K_1$ first frequency domain segments and the $K_2$ second frequency domain segments according to one of four division manners described below.

The first division manner is to divide first $(K_1*G_1)$ frequency domain subbands in the total frequency domain distance D into the $K_1$ first frequency domain segments, and divide last $(K_2*G_2)$ frequency domain subbands in the total frequency domain distance D into the $K_2$ second frequency domain segments.

For example, as shown in FIG. 10, K=4 and N=9 (i.e., 9 subbands are actually scheduled in the PUSCH), and D=18, and thus $$G_1 = \left\lceil \frac{D}{K} \right\rceil = \left\lceil \frac{18}{4} \right\rceil = 5, G_2 = \left\lfloor \frac{D}{K} \right\rfloor = \left\lfloor \frac{18}{4} \right\rfloor = 4,$$

$K_1$=mod(D, K)=mod(18, 4)=2, and $K_2$=K−$K_1$=2. Therefore, first two frequency domain segments each include 5 frequency domain subbands, that is, frequency domain subbands 0 to 4 belong to the frequency domain segment 0, and frequency domain subbands 5 to 9 belong to the frequency domain segment 1; and last two frequency domain segments 2 and 3 each include 4 frequency domain subbands. Since scheduling subbands 0 and 2 in the PUSCH belong to the frequency domain segment 0, the precoding information of scheduling subbands 0 and 2 is indicated by the precoding indication $I_0$. Since scheduling subbands 5 and 8 in the PUSCH belong to the frequency domain segment 1, the precoding information of scheduling subbands 5 and 8 is indicated by the precoding indication $I_0$. Since scheduling subbands 12 and 13 in the PUSCH belong to the frequency domain segment 2, the precoding information of scheduling subbands 12 and 13 is indicated by the precoding indication $I_2$. Since scheduling subbands 14, 15 and 17 in the PUSCH belong to the frequency domain segment 3, the precoding information of scheduling subbands 14, 15 and 17 is indicated by the precoding indication $I_3$.

The second division manner is to divide first $(K_2*G_2)$ frequency domain subbands in the total frequency domain distance D into the $K_2$ second frequency domain segments, and dividing last $(K_1*G_1)$ frequency domain subbands in the total frequency domain distance D into the $K_1$ first frequency domain segments.

The third division manner is to alternately and sequentially divide the total frequency domain distance D into a first frequency domain segment and a second frequency domain segment. That is, first $G_1$ continuous frequency domain subbands in the total frequency domain distance D are divided into a first frequency domain segment, next $G_1$ continuous frequency domain subbands are divided into a second frequency domain segment, next $G_1$ continuous frequency domain subbands are divided into a first frequency domain segment, and so forth until $K_1$ or $K_2$ frequency domain segments are placed. If $K_1$ is not equal to $K_2$, the last several frequency domain subbands will not be alternated. For example, as shown in FIG. 11, frequency domain segments 0 and 2 each include 5 continuous frequency domain subbands, while frequency domain segments 1 and 3 each include 4 continuous frequency domain subbands.

The fourth division manner is to alternately divide frequency domain subbands in the total frequency domain distance D into a first frequency domain segment and a second frequency domain segment reversely. For example, first $G_1$ continuous frequency domain subbands in the total frequency domain distance D are divided into a first frequency domain segment, next $G_1$ continuous frequency domain subbands are divided into a second first frequency domain segment, next $G_2$ continuous frequency domain subbands are divided into a first second frequency domain segment, then next $G_2$ continuous frequency domain subbands are divided into a second frequency domain segment, and so forth until $K_1$ or $K_2$ frequency domain segments are placed. If $K_1$ is not equal to $K_2$, the last several frequency domain subbands will not be alternated.

In step S703, a one-to-one correspondence between multiple precoding indications in the DCI and multiple divided frequency domain segments is established, where multiple scheduling subbands allocated in the same frequency domain segment correspond to the same precoding indication.

For example, when the first division manner is adopted, the total frequency domain distance D of the scheduling subbands in the PUSCH is divided into K frequency domain segments, where each precoding indication in $K_1$ precoding indications corresponds to $G_1$ frequency domain subbands, and each precoding indication in $K_2$ precoding indications corresponds to $G_2$ frequency domain subbands. Scheduling subbands allocated in the same frequency domain segment correspond to the same precoding indication. Each frequency domain segment corresponds to one precoding indication.

In this embodiment, the total frequency domain distance D of the scheduling subbands in the PUSCH is divided into K frequency domain segments, and each frequency domain segment includes several frequency domain subbands. Scheduling subbands allocated in one frequency domain segment correspond to the same precoding indication. Each frequency domain segment corresponds to one precoding indication, that is, K precoding indications and K frequency domain segments are in a one-to-one correspondence.

The method described in this embodiment is also applicable to a case of two-level DCI, that is, K precoding indications are included in two DCIs.

Figures 12, 13:
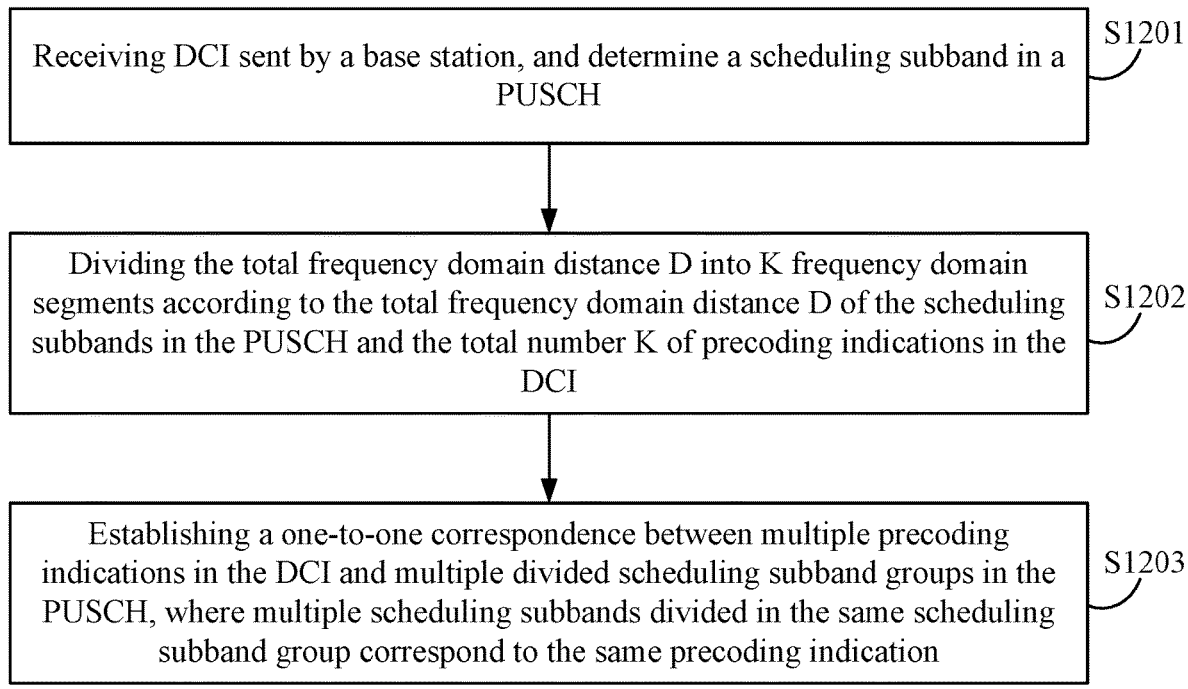
FIG. 12 is a flowchart of a scheduling subband allocation method according to a fourth embodiment of the present application.
FIG. 13 is a schematic diagram showing a first division manner according to the fourth embodiment of the present application.

In the solution of the above embodiment three, the correspondence between the precoding indications and the scheduling subbands in the PUSCH is related to the total frequency domain distance of the scheduling subbands in the PUSCH, so that scheduling subbands with farther frequency domain distances and less similar channels use different precoding indications, and the frequency selectivity channel can be well resisted. However, when the total frequency domain distance D of the scheduling subbands in the PUSCH is divided into K frequency domain segments and each frequency domain segment corresponds to one precoding indication, if the PUSCH is not scheduled on some frequency domain segments, waste may be occur. In order to reduce waste, a fourth embodiment of the present application provides a scheduling subband allocation method. As shown in FIG. 12, the method includes steps S1201, S1202 and S1203. In step S1201, DCI sent by a base station is received, and a scheduling subband in a PUSCH is determined.

In step S1202, the scheduling subbands in the PUSCH are divided into at most K scheduling subband groups according to the total number N of the scheduling subbands in the PUSCH, a total frequency domain distance D of the scheduling subbands in the PUSCH and the total number K of precoding indications in the DCI, where a total frequency domain distance of scheduling subbands in at least part of the scheduling subband groups is not greater than T.

T is at least determined by D and K. In one embodiment, $$T = \left\lceil \frac{D}{K} \right\rceil.$$

The value of T may also be a default value or notified through high-layer signaling.

In one embodiment, each scheduling subband group includes at least P continuous scheduling subbands, or each scheduling subband group includes at most P continuous scheduling subbands. The value of P is at least determined by values of N and K. In one embodiment, in a case where each scheduling subband group includes at least P continuous scheduling subbands, $$P = \left\lfloor \frac{N}{K} \right\rfloor;$$

while in a case where each scheduling subband group includes at most P continuous scheduling subbands, $$P = \left\lceil \frac{N}{K} \right\rceil.$$

P may also be a default value such as 1, or notified through signaling such as high-layer signaling.

In one embodiment, the step 1202 may include two division manners described below.

The first division manner is to divide the scheduling subbands in the PUSCH into K scheduling subband groups, where a total frequency domain distance of scheduling subbands in each of at least $K_1$ scheduling subband groups in the K scheduling subband groups is not greater than T; where $K_1$=mod(N, K). In one embodiment, each scheduling subband group includes at most P continuous PUSCH scheduling subbands.

For example, the scheduling subbands in the PUSCH are divided into K scheduling subband groups, including $K_1$ first scheduling subband groups and $K_1$ second scheduling subband groups, where each first scheduling subband group includes $A_1$ scheduling subbands, each second scheduling subband group includes $A_2$ scheduling subbands, and a total frequency domain distance of the $A_1$ scheduling subbands in each first scheduling subband group is not greater than T. It is to be noted that a total frequency domain distance of the $A_2$ scheduling subbands in each second scheduling subband group may be greater than T.

$$K_1 = \text{mod}(N, K),\ K_2 = K - K_1,\ A_1 = \left\lceil \frac{N}{K} \right\rceil,\ \text{and}\ A_2 = \left\lfloor \frac{N}{K} \right\rfloor.$$

In one embodiment, an exemplary division process of the first division method is as follows: step 1, step 2, and step 3.

In step 1, initialize, where the subband group j=0, and n=1.

In step 2, a PUSCH precoding indication j corresponds to a PUSCH scheduling subband group j.

In one embodiment, the step 2 includes step a, step b and step c.

In step a, the n-th to (n+$A_2$)-th PUSCH scheduling subbands belong to the subband group j.

In step b, if the distance of from the n-th PUSCH scheduling subband to the (n+$A_1$)-th PUSCH scheduling subband is not greater than $G_1$ and $j<K_1$, the $(n+A_1)$-th PUSCH scheduling subband also belongs to the subband group j.

In step c, $j=j+1$.

n becomes a next PUSCH scheduling subband of the last subband in the PUSCH scheduling subband group j.

In step 3, repeat step 2 until j is the last scheduling subband group.

As shown in FIG. 13, D=18, K=4, N=9, and frequency domain subbands corresponding to scheduling subbands in the PUSCH are 0, 1, 2, 3, 4, 5, 15, 16, and 17, and thus $$A_1 = \left\lceil \frac{N}{K} \right\rceil = \left\lceil \frac{9}{4} \right\rceil = 3, \quad A_2 = \left\lfloor \frac{N}{K} \right\rfloor = \left\lfloor \frac{9}{4} \right\rfloor = 2,$$

$$K_1 = \mathrm{mod}(N, K) = 1, \quad K_2 = K - K_1 = 3, \quad \text{and} \quad T = \left\lceil \frac{D}{K} \right\rceil = 5.$$

Therefore, each of $K_1$ precoding indications corresponds to $A_1$ scheduling subbands, and the $A_1$ scheduling subbands must meet the requirement that the total frequency domain distance is less than or equal to T. Since the total frequency domain distance of scheduling subbands 0, 1 and 2 scheduled in the PUSCH is 2−0+1=3, which is less than T, the scheduling subbands 0, 1 and 2 scheduled in the PUSCH share the first precoding indication. Since $K_1=1$, remaining three precoding indications each correspond to two continuous scheduling subbands. In this case, there is a small disadvantage that scheduling subbands 5 and 15 share one precoding indication and the total frequency domain distance of scheduling subbands 5 and 15 is greater than T. However, since the location of the scheduling subband is very flexible, it is difficult to cope with all scenarios.

The second division manner is to divide the scheduling subbands in the PUSCH into the at most K scheduling subband groups, where a total frequency domain distance of scheduling subbands in each scheduling subband group is not greater than T.

In one embodiment, each scheduling subband group can be limited to include at most P continuous PUSCH scheduling subbands.

For example, the scheduling subbands in the PUSCH are divided into K scheduling subband groups, each scheduling subband group includes at most P scheduling subbands, and the total frequency domain distance of scheduling subbands in each scheduling subband group is not greater than T. In a case where an i-th precoding indication corresponds to a j-th scheduling subband, when whether a (j+1)-th scheduling subband also corresponds to the i-th precoding indication is determined, the following two conditions need to be determined.

The condition 1 is whether the number of scheduling subbands corresponding to the i-th precoding indication has reached P, and if it has reached P, the (j+1)-th scheduling subband corresponds to an (i+1)-th precoding indication; while if it has not reached P, the second condition further needs to be determined.

The second condition is that if the (j+1)-th scheduling subband also corresponds to the i-th precoding indication, that is, the (j+1)-th scheduling subband and the j-th scheduling subband belong to the same scheduling subband group, whether the total frequency domain distance of this scheduling subband group is greater than T needs to be determined, and if it is greater than T, the (j+1)-th scheduling subband corresponds to the (i+1)-th precoding indication; while if it is not greater than T, the (j+1)-th scheduling subband also corresponds to the i-th precoding indication. Based on the above two conditions, I and j both start with 1. The precoding indications corresponding to the scheduling subbands of FIG. 13 are different. As shown in FIG. 14, each scheduling subband group includes at most 3 scheduling subbands, and the total frequency domain distance of each scheduling subband group is not greater than 3. The first scheduling subband 0 belongs to the scheduling subband group 0. When whether the scheduling subband 1 belongs to the scheduling subband group 0 is determined, two conditions need to be determined. If the scheduling subband 1 is also brought into the scheduling subband group 0, whether the number of the scheduling subbands in the scheduling subband group 0 exceeds a limit value needs to be determined, and whether the total frequency domain distance of the scheduling subband group 0 exceeds a limit value needs to be determined. Obviously, both limit values are not exceed, so the scheduling subband 1 also belongs to the scheduling subband group 0, and precoding information is notified by a precoding indication $I_0$. That the scheduling subband 2 also belongs to scheduling subband group 0 is determined in the same way. Since the number of scheduling subbands of the scheduling subband group 0 exceeds 3 if the scheduling subband 3 is added to the scheduling subband group 0, the scheduling subband 3 must belong to the scheduling subband group 1. FIG. 14 can be obtained by sequentially determining the next scheduling subband. As can be seen from FIG. 14, this solution may result in that the last precoding indications have no corresponding scheduling subband, and thus these indication bits are wasted. But this is a disadvantage due to scheduling and cannot be avoided.

In step S1203, a one-to-one correspondence between multiple precoding indications in the DCI and multiple divided scheduling subband groups in the PUSCH is established, where multiple scheduling subbands divided in the same scheduling subband group correspond to the same precoding indication.

This embodiment limits the total frequency domain distance of scheduling subbands of part of scheduling subband groups, so that the scheduling subbands corresponding to the same precoding indication in frequency domain are as close as possible, bringing benefits to the scheduling. The problem of too large total frequency domain distance of scheduling subbands corresponding to the same precoding indication is avoided, thereby avoiding the performance loss.

The method described in this embodiment is also applicable to a case of level 2 DCI, that is, K precoding indications are included in two DCIs.

A fifth embodiment of the present application provides a scheduling subband allocation apparatus. As shown in FIG. 15, the apparatus includes the following components: a receiving module 1501 and a processing module 1502.

The receiving module 1501 is configured to receive DCI sent by a base station, and determine a scheduling subband in a PUSCH.

The processing module 1502 is configured to establish a correspondence between precoding indications in the DCI and the scheduling subbands in the PUSCH according to at least one parameter of the total number of the scheduling subbands in the PUSCH or a total frequency domain distance of the scheduling subbands in the PUSCH and according to the total number of the precoding indications in the DCI.

In one embodiment, the total number of the precoding indications in the DCI is configured through high-layer signaling.

The processing module 1502 is further configured to:
divide N scheduling subbands in the PUSCH into $K_1$ first scheduling subband groups and $k_2$ second scheduling subband groups according to the total number N of scheduling subbands in the PUSCH and the total number K of precoding indications in the DCI, where each first scheduling subband group includes $A_1$ scheduling subbands, and each second scheduling subband group includes $A_2$ scheduling subbands; and establish a one-to-one correspondence between multiple precoding indications in the DCI and multiple divided scheduling subband groups in the PUSCH, where multiple scheduling subbands divided in the same scheduling subband group correspond to the same precoding indication; or $$K_1 = \mathrm{mod}(N, K), \quad K_2 = K - K_1, \quad A_1 = \left\lceil \frac{N}{K} \right\rceil, \text{ and } A_2 = \left\lfloor \frac{N}{K} \right\rfloor;$$

or
divide the total frequency domain distance D into K frequency domain segments according to the total frequency domain distance D of the scheduling subbands in the PUSCH and the total number K of the precoding indications in the DCI; and establish a one-to-one correspondence between multiple precoding indications in the DCI and multiple divided frequency domain segments, where multiple scheduling subbands allocated in the same frequency domain segment corresponds to the same precoding indication; or divide the scheduling subbands in the PUSCH into at most K scheduling subband groups according to the total number N of the scheduling subbands in the PUSCH, the total frequency domain distance D of the scheduling subbands in the PUSCH and the total number K of the precoding indications in the DCI, where a total frequency domain distance of scheduling subbands in at least part of the scheduling subband groups is not greater than T; and establish a one-to-one correspondence between multiple precoding indications in the DCI and multiple divided scheduling subband groups in the PUSCH, wherein multiple scheduling subbands in the same scheduling subband group corresponds to the same precoding indication; where T is at least determined by D and K.

In one embodiment, when the processing module 1502 divides the N scheduling subbands in the PUSCH into $K_1$ first scheduling subband groups and $K_2$ second scheduling subband groups according to the total number N of scheduling subbands in the PUSCH and the total number K of the precoding indications in the DCI, the processing module 1502 is further configured to:
divide first $(K_1*A_1)$ scheduling subbands in the PUSCH into the $K_1$ first scheduling subband groups, and divide last $(K_2*A_2)$ scheduling subbands in the PUSCH into the $K_2$ second scheduling subband groups, establish a one-to-one correspondence between first $K_1$ precoding indications in the DCI and the $K_1$ first scheduling subband groups, and establish a one-to-one correspondence between last $K_2$ precoding indications in the DCI and the $K_2$ second scheduling subband groups; or
alternately and sequentially divide the N scheduling subbands in the PUSCH into a first scheduling subband group and a second scheduling subband group.

In one embodiment, when the processing module 1502 divides the total frequency domain distance D into K frequency domain segments according to the total frequency domain distance D of the scheduling subbands in the PUSCH and the total number K of precoding indications in the DCI, the processing module 1502 is further configured to:
divide the total frequency domain distance D into $K_1$ first frequency domain segments and $K_2$ second frequency domain segments, where each first frequency domain segment includes $G_1$ continuous frequency domain subbands, and each second frequency domain segment includes $G_2$ continuous frequency domain subbands; where $$K_1 = \mathrm{mod}(D, K), \quad K_2 = K - K_1, \quad G_1 = \left\lceil \frac{D}{K} \right\rceil, \text{ and } G_2 = \left\lfloor \frac{D}{K} \right\rfloor.$$

In one embodiment, when the processing module 1502 divides the total frequency domain distance D into the $K_1$ first frequency domain segments and the $K_2$ second frequency domain segments, it, for example, may include the following steps:
dividing first $(K_1*G_1)$ frequency domain subbands in the total frequency domain distance D into the $K_1$ first frequency domain segments, and dividing last $(K_2*G_2)$ frequency domain subbands in the total frequency domain distance D into the $K_2$ second frequency domain segments; or
alternately and sequentially dividing the total frequency domain distance D into a first frequency domain segment and a second frequency domain segment.

In one embodiment, when the processing module 1502 divides the scheduling subbands in the PUSCH into at most K scheduling subband groups according to the total number N of the scheduling subbands in the PUSCH, the total frequency domain distance D of the scheduling subbands in the PUSCH and the total number K of the precoding indications in the DCI, where a total frequency domain distance of scheduling subbands in at least part of the scheduling subband groups is not greater than T, the processing module 1502 is further configured to:
divide the scheduling subbands in the PUSCH into K scheduling subband groups, where a total frequency domain distance of scheduling subbands in each of at least $K_1$ scheduling subband groups in the K scheduling subband groups is not greater than T; where $K_1$=mod (N, K); or
divide the scheduling subbands in the PUSCH into at most K scheduling subband groups, where a total frequency domain distance of scheduling subbands in each scheduling subband groups is not greater than T.

In one embodiment, $$T = \left\lceil \frac{D}{K} \right\rceil.$$

In one embodiment, each scheduling subband group includes at least P continuous scheduling subbands, or each scheduling subband group includes at most P continuous scheduling subbands. P is at least determined by N and K.

In one embodiment, in a case where each scheduling subband group includes at least P continuous PUSCH scheduling subbands, $$P = \left\lfloor \frac{N}{K} \right\rfloor.$$

In a case where each scheduling subband group includes at most P continuous scheduling subbands, $$P = \left\lceil \frac{N}{K} \right\rceil.$$

A sixth embodiment of the present application provides a scheduling subband allocation device. As shown in FIG. 16, the device includes a processor 1601, a memory 1602, and a communication bus.

The communication bus is configured to implement connection communication between the processor 1601 and the memory 1602.

The processor 1601 is configured to execute a scheduling subband allocation program stored in the memory 1602 to implement the steps described below.

DCI sent by a base station is received, and a scheduling subband in a PUSCH is determined.

A correspondence between precoding indications in the DCI and the scheduling subbands in the PUSCH is established according to at least one parameter of the total number of the scheduling subbands in the PUSCH or a total frequency domain distance of the scheduling subbands in the PUSCH and according to the total number of the precoding indications in the DCI.

A seventh embodiment of the present application provides a computer-readable storage medium configured to store a scheduling subband allocation program.

When the scheduling subband allocation program is executed by at least one processor, the at least one processor performs the steps described below.

DCI sent by a base station is received, and a scheduling subband in a PUSCH is determined.

A correspondence between precoding indications in the DCI and the scheduling subbands in the PUSCH is established according to at least one parameter of the total number of the scheduling subbands in the PUSCH or a total frequency domain distance of the scheduling subbands in the PUSCH and according to the total number of the precoding indications in the DCI.

The scheduling subband allocation method and apparatus, device and readable storage medium described in the present application provide a method for indicating precoding information to an uplink scheduling subband, and especially, in a case where the number of precoding indications in the DCI is less than the number of scheduling subbands in the PUSCH, provide a method for establishing a correspondence between precoding indications in the DCI and scheduling subbands in the PUSCH. Therefore, the scheduling subband corresponding to each precoding indication is relatively averaged in both the number and the frequency domain distance, thereby reducing the performance loss of the precoding indication. The present application can also notify precoding information of the uplink scheduling subband whose quantity dynamically varies by using a fixed precoding indication in the DCI.

It will be understood by those skilled in the art that all or part of the steps in the methods described above may be implemented by related hardware instructed by programs, and these programs may be stored in a computer-readable storage medium such as a read-only memory, a magnetic disk or an optical disk. Optionally, all or part of the steps in the embodiments described above may also be implemented by using one or more integrated circuits. Accordingly, the various modules/units in the embodiments described above may be implemented by hardware or in the form of software function modules. The present application is not limited to any specific combination of hardware and software.

What is claimed is:

1. A scheduling subband allocation method, comprising:
    receiving downlink control information (DCI) sent by a base station, and determining scheduling subbands in a physical uplink shared channel (PUSCH); and
    establishing a correspondence between precoding indications in the DCI and the scheduling subbands in the PUSCH according to at least one parameter of a total number of the scheduling subbands in the PUSCH or a total frequency domain distance of the scheduling subbands in the PUSCH and according to a total number of the precoding indications in the DCI.

2. The method of claim 1, wherein the total number of the precoding indications in the DCI is configured through high-layer signaling.

3. The method of claim 1, wherein the establishing the correspondence between the precoding indications in the DCI and the scheduling subbands in the PUSCH according to at least one parameter of the total number of the scheduling subbands in the PUSCH or the total frequency domain distance of the scheduling subbands in the PUSCH and according to the total number of the precoding indications in the DCI comprises:
    dividing N scheduling subbands in the PUSCH into $K_1$ first scheduling subband groups and $K_2$ second scheduling subband groups according to the total number N of scheduling subbands in the PUSCH and the total number K of precoding indications in the DCI, wherein each of the $K_1$ first scheduling subband groups comprises $A_1$ scheduling subbands, and each of the $K_2$ second scheduling subband groups comprises $A_2$ scheduling subbands; and
    establishing a one-to-one correspondence between the precoding indications in the DCI and a plurality of divided scheduling subband groups in the PUSCH, wherein a plurality of scheduling subbands divided in a same scheduling subband group correspond to a same precoding indication;
wherein $$K_1 = \mathrm{mod}(N, K), \quad K_2 = K - K_1, \quad A_1 = \left\lceil \frac{N}{K} \right\rceil, \quad \text{and} \quad A_2 = \left\lfloor \frac{N}{K} \right\rfloor.$$

4. The method of claim 3, wherein the dividing the N scheduling subbands in the PUSCH into the $K_1$ first scheduling subband groups and the $K_2$ second scheduling subband groups comprises:
    dividing first ($K_1 * A_1$) scheduling subbands in the PUSCH into the $K_1 K_1$ first scheduling subband groups, and dividing last ($K_2 * A_2$) scheduling subbands in the PUSCH into the $K_2$ second scheduling subband groups; and
    the establishing the one-to-one correspondence between the precoding indications in the DCI and the plurality of divided scheduling subband groups in the PUSCH comprises:
    establishing a one-to-one correspondence between first $K_1$ precoding indications in the DCI and the $K_1$ first scheduling subband groups, and establishing a one-to-one correspondence between last $K_2$ precoding indications in the DCI and the $K_2$ second scheduling subband groups.

5. The method of claim 3, wherein the dividing the N scheduling subbands in the PUSCH into the $K_1$ first scheduling subband groups and the $K_2$ second scheduling subband groups comprises:
  alternately dividing the N scheduling subbands in the PUSCH into a first scheduling subband group and a second scheduling subband group in sequence.

6. The method of claim 1, wherein the establishing the correspondence between the precoding indications in the DCI and the scheduling subbands in the PUSCH according to at least one parameter of the total number of the scheduling subbands in the PUSCH or the total frequency domain distance of the scheduling subbands in the PUSCH and according to the total number of the precoding indications in the DCI comprises:
  dividing the total frequency domain distance D into K frequency domain segments according to the total frequency domain distance D of the scheduling subbands in the PUSCH and the total number K of the precoding indications in the DCI; and
  establishing a one-to-one correspondence between the precoding indications in the DCI and a plurality of divided frequency domain segments, wherein a plurality of scheduling subbands allocated in a same frequency domain segment correspond to a same precoding indication.

7. The method of claim 6, wherein the dividing the total frequency domain distance D into the K frequency domain segments comprises:
  dividing the total frequency domain distance D into $K_1$ first frequency domain segments and $K_2$ second frequency domain segments, wherein each of the $K_1$ first frequency domain segments comprises $G_1$ continuous frequency domain subbands, and each of the $K_2$ second frequency domain segments comprises $G_2$ continuous frequency domain subbands;
  wherein $$K_1 = \mathrm{mod}(D, K), \quad K_2 = K - K_1, \quad G_1 = \left\lceil \frac{D}{K} \right\rceil, \text{ and } G_2 = \left\lfloor \frac{D}{K} \right\rfloor.$$

8. The method of claim 7, wherein the dividing the total frequency domain distance D into the $K_1$ first frequency domain segments and the $K_2$ second frequency domain segments comprises:
  dividing first $(K_1*G_1)$ frequency domain subbands in the total frequency domain distance D into the $K_1$ first frequency domain segments, and dividing last $(K_2*G_2)$ frequency domain subbands in the total frequency domain distance D into the $K_2$ second frequency domain segments.

9. The method of claim 7, wherein the dividing the total frequency domain distance D into the $K_1$ first frequency domain segments and the $K_2$ second frequency domain segments comprises:
  alternately dividing the total frequency domain distance D into a first frequency domain segment and a second frequency domain segment in sequence.

10. The method of claim 1, wherein the establishing the correspondence between the precoding indications in the DCI and the scheduling subbands in the PUSCH according to at least one parameter of the total number of the scheduling subbands in the PUSCH or the total frequency domain distance of the scheduling subbands in the PUSCH and according to the total number of the precoding indications in the DCI comprises:
  dividing the scheduling subbands in the PUSCH into at most K scheduling subband groups according to the total number N of the scheduling subbands in the PUSCH, the total frequency domain distance D of the scheduling subbands in the PUSCH and the total number K of the precoding indications in the DCI, wherein a total frequency domain distance of scheduling subbands in at least part of the scheduling subband groups is not greater than T; and
  establishing a one-to-one correspondence between the precoding indications in the DCI and a plurality of divided scheduling subband groups in the PUSCH, wherein a plurality of scheduling subbands in a same scheduling subband group correspond to a same precoding indication;
  wherein T is at least determined by D and K.

11. The method of claim 10, wherein the scheduling subbands in the PUSCH are divided into K scheduling subband groups, and a total frequency domain distance of scheduling subbands in each of at least $K_1$ scheduling subband groups in the K scheduling subband groups is not greater than T; wherein $K_1 = \mathrm{mod}(N, K)$.

12. The method of claim 10, wherein the dividing the scheduling subbands in the PUSCH into the at most K scheduling subband groups, wherein the total frequency domain distance of the scheduling subbands in the at least part of the scheduling subband groups is not greater than T comprises:
  dividing the scheduling subbands in the PUSCH into the at most K scheduling subband groups, wherein a total frequency domain distance of scheduling subbands in each of the at most K scheduling subband groups is not greater than T.

13. The method of claim 10, wherein $$T = \left\lceil \frac{D}{K} \right\rceil.$$

14. The method of claim 10, wherein each of the scheduling subband groups comprises at least P continuous scheduling subbands, or each of the scheduling subband groups comprises at most P continuous scheduling subbands;
  wherein P is at least determined by N and K.

15. The method of claim 14, wherein in response to each of the scheduling subband groups comprising at least P continuous scheduling subbands, $$P = \left\lfloor \frac{N}{K} \right\rfloor;$$

and
  in response to each of the scheduling subband groups comprising at most P continuous scheduling subbands, $$P = \left\lceil \frac{N}{K} \right\rceil.$$

16. A scheduling subband allocation device, comprising: a processor, a memory and a communication bus;
    wherein the communication bus is configured to implement a connection communication between the processor and the memory; and
    the processor is configured to execute a scheduling subband allocation program stored in the memory to perform the scheduling subband allocation method of claim 1.

17. A scheduling subband allocation apparatus, comprising:
    a receiving module, which is configured to receive downlink control information (DCI) sent by a base station, and determine scheduling subbands in a physical uplink shared channel (PUSCH); and
    a processing module, which is configured to establish a correspondence between precoding indications in the DCI and the scheduling subbands in the PUSCH according to at least one parameter of a total number of the scheduling subbands in the PUSCH or a total frequency domain distance of the scheduling subbands in the PUSCH and according to a total number of the precoding indications in the DCI.

18. The apparatus of claim 17, wherein the processing module is further configured to:
    divide N scheduling subbands in the PUSCH into $K_1$ first scheduling subband groups and $K_2$ second scheduling subband groups according to the total number N of scheduling subbands in the PUSCH and the total number K of precoding indications in the DCI, wherein each of the $A_1$ first scheduling subband groups comprises $A_2$ scheduling subbands, and each of the $K_1$ second scheduling subband groups comprises $A_2$ scheduling subbands; and
    establish a one-to-one correspondence between the precoding indications in the DCI and a plurality of divided scheduling subband groups in the PUSCH, wherein a plurality of scheduling subbands divided in a same scheduling subband group correspond to a same precoding indication;

wherein, $$K_1 = \mathrm{mod}(N, K), \quad K_2 = K - K_1, \quad A_1 = \left\lceil \frac{N}{K} \right\rceil, \quad \text{and} \quad A_2 = \left\lfloor \frac{N}{K} \right\rfloor.$$

19. The apparatus of claim 17, wherein the processing module is further configured to:
    divide the total frequency domain distance D into K frequency domain segments according to the total frequency domain distance D of the scheduling subbands in the PUSCH and the total number K of the precoding indications in the DCI; and
    establish a one-to-one correspondence between the precoding indications in the DCI and a plurality of divided frequency domain segments, wherein a plurality of scheduling subbands allocated in a same frequency domain segment correspond to a same precoding indication.

20. The apparatus of claim 17, wherein the processing module is further configured to:
    divide the scheduling subbands in the PUSCH into at most K scheduling subband groups according to the total number N of the scheduling subbands in the PUSCH, the total frequency domain distance D of the scheduling subbands in the PUSCH and the total number K of the precoding indications in the DCI, wherein a total frequency domain distance of scheduling subbands in at least part of the scheduling subband groups is not greater than T; and
    establish a one-to-one correspondence between the precoding indications in the DCI and a plurality of divided scheduling subband groups in the PUSCH, wherein a plurality of scheduling subbands in a same scheduling subband group correspond to a same precoding indication;
    wherein T is at least determined by D and K.

* * * * *